United States Patent
Ju et al.

(10) Patent No.: US 10,017,594 B2
(45) Date of Patent: Jul. 10, 2018

(54) METHOD FOR PREPARING VINYL CHLORIDE COPOLYMER AND VINYL CHLORIDE COPOLYMER PRODUCED BY THE SAME

(71) Applicant: LG CHEM, LTD., Seoul (KR)

(72) Inventors: Jin Hyuck Ju, Daejeon (KR); Hyun Kyou Ha, Daejeon (KR); Joong Chul Lim, Daejeon (KR); Yang Jun Jeon, Daejeon (KR); Min Jeong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/242,192

(22) Filed: Aug. 19, 2016

(65) Prior Publication Data
US 2017/0121438 A1 May 4, 2017

(30) Foreign Application Priority Data
Jul. 3, 2015 (KR) ........................ 10-2015-0095412

(51) Int. Cl.
| | |
|---|---|
| C08F 214/06 | (2006.01) |
| C08L 13/02 | (2006.01) |
| C08G 73/12 | (2006.01) |
| C08F 259/04 | (2006.01) |
| C08F 222/40 | (2006.01) |

(52) U.S. Cl.
CPC .......... *C08F 214/06* (2013.01); *C08F 259/04* (2013.01); *C08G 73/12* (2013.01); *C08F 222/40* (2013.01)

(58) Field of Classification Search
USPC ....................................................... 526/262
See application file for complete search history.

(56) References Cited

U.S. PATENT DOCUMENTS

| | | | |
|---|---|---|---|
| 3,666,720 A | 5/1972 | Nield et al. | |
| 6,747,083 B2 * | 6/2004 | Takaki | C08F 255/00 524/458 |

FOREIGN PATENT DOCUMENTS

| | | |
|---|---|---|
| GB | 1260377 A | 1/1972 |
| GB | 1293542 A | 10/1972 |
| JP | 02229813 A | 9/1990 |
| JP | 06107732 A | 4/1994 |
| JP | 06107734 S | 4/1994 |
| JP | H06-107732 A * | 4/1994 |
| KR | 10-2005-0075886 A | 7/2005 |
| KR | 10-2011-0006223 * | 1/2011 |
| KR | 1020110006223 A | 1/2011 |
| KR | 102012007227 A | 1/2012 |

* cited by examiner

*Primary Examiner* — Mark Kaucher
*Assistant Examiner* — Henry Hu
(74) *Attorney, Agent, or Firm* — Dentons US LLP

(57) ABSTRACT

The present invention relates to a method for preparing a vinyl chloride copolymer having good heat resistance and a vinyl chloride copolymer produced by the same. In the preparation method, by not injecting an N-substituted maleimide based compound used as a comonomer together with a vinyl chloride monomer at one time in a prepolymerization step, but in division in a specific ratio, a copolymer with a uniform distribution of the N-substituted maleimide based compound and the vinyl chloride monomer may be easily prepared, and the vinyl chloride copolymer may have good heat resistance. Accordingly, the preparation method of a vinyl chloride copolymer and the vinyl chloride copolymer according to the present invention may be easily applied to industries requiring the copolymer, particularly industries requiring a resin having good heat resistance as well as industries using a vinyl chloride resin.

11 Claims, No Drawings

METHOD FOR PREPARING VINYL CHLORIDE COPOLYMER AND VINYL CHLORIDE COPOLYMER PRODUCED BY THE SAME

CROSS-REFERENCE TO RELATED APPLICATIONS

This application claims the benefits of priority from Korean Patent Application No. 10-2015-0095412, filed on Jul. 3, 2015, the entire contents described in the disclosure of corresponding Korean patent applications are hereby incorporated as a part of the present specification.

TECHNICAL FIELD

[Technical Field]

The present invention relates to a method for preparing a vinyl chloride copolymer having good heat resistance and a vinyl chloride copolymer produced by the same.

[Background Art]

Generally, a synthetic resin material for fire protection uses a vinyl chloride resin for manufacturing a drain pipe. The vinyl chloride resin is a polymer containing 50% or more of vinyl chloride, is inexpensive, has hardness which may be easily controlled, is applicable to most processing equipments, and has various application fields. In addition, the vinyl chloride resin has good physical and chemical properties such as mechanical strength, climate resistance, and chemical resistance, and may be widely used in various fields such as building materials, household items, interior materials of a car, and decorations.

However, according to the installation and maintenance of an indoor fire hose station and safety management, the act on fire equipment is reinforced such that a vinyl chloride resin having good heat resistance and flame retardancy, and not generating deformation due to heat at 80° C. in 24 hours is required to be used. Therefore, the application of the vinyl chloride resin to a synthetic resin material for fire protection is restricted.

The heat resistance and flame retardancy of the vinyl chloride resin are not good, and if the resin is exposed to fire or to high heat such as a hot water pipe or spring water pipe, pressure resistance, mechanical strength and chemical performance may be rapidly deteriorated. Accordingly, a chlorinated polyvinyl chloride (CPVC) resin having improved heat resistance, flame retardancy and durability, which are the greatest weakness of the vinyl chloride resin has been developed.

The CPVC is a chlorinated resin having increased chloride by 20% than a common vinyl chloride resin, has increased glass transition temperature and heat deformation temperature, and has good heat resistance by which the resin may stand the heat up to 120° C., strong resistance to corrosion by sulfuric acid, hydrochloric acid, nitric acid, etc., self-extinguishability, and processability. Accordingly, the CPVC has excellent chemical resistance as well as fire protection property, may be easily applied to a pipe for chemical reagents with high temperature, and has high world and domestic market share (world market growth rate of about 7.2%/year, domestic market growth rate of about 10%/year).

Therefore, the development on resins which may replace the CPVC is required to meet the change of the markets. Particularly, the entire quantity of the CPVC is dependent on imports in a domestic case, and the development on resins which may replace the CPVC is eagerly required.

Various methods have been suggested, and UK Patent No. 1,293,542 suggested a thermoplastic resin composition obtained by mixing a copolymer of an N-aryl maleimide compound and a methacrylic acid ester monomer containing at least 50 wt % of methyl methacrylate, or a copolymer obtained by combining an N-aryl maleimide compound, the monomer, and an another copolymerizable monomer, with a vinyl chloride polymer. However, the heat resistance of the composition is insufficient to replace the CPVC.

In addition, a method for preparing a vinyl chloride resin having increased heat resistance via a suspension polymerization with the injection of an N-substituted maleimide based monomer to a vinyl chloride monomer at one time or in division, has been suggested. However, according to the preparation method via the suspension polymerization, reaction time may be delayed with the injection of the N-substituted maleimide based monomer, the reactivity may decrease due to the formation of the resonance structure of the N-substituted maleimide based monomer. In addition, due to the non-uniformity of the vinyl chloride monomer and the N-substituted maleimide based monomer during polymerization, the copolymer thus prepared may have two glass transition temperatures, and at last, the increase of the heat resistance may become trivial.

Therefore, the development of a resin having good heat resistance and flame retardancy, and is capable of replacing CPVC, is still required.

DISCLOSURE OF THE INVENTION

Technical Problem

According to an aspect of the present invention to solve the defects of the prior art, there is provided a method for preparing a vinyl chloride copolymer having good heat resistance.

According to another aspect of the present invention, there is provided a vinyl chloride copolymer prepared by the above-described preparation method.

Technical Solution

According to an aspect of the present invention, there is provided a method for preparing a vinyl chloride copolymer including pre-polymerizing for forming seed particles by polymerizing a vinyl chloride monomer and a first copolymerizable monomer (Step 1); and post-polymerizing for adding a second copolymerizable monomer to the seed particles and polymerizing (Step 2), wherein a total amount of the first copolymerizable monomer and the second copolymerizable monomer is from 5 to 30 parts by weight on the basis of 100 parts by weight of the vinyl chloride monomer.

In addition, according to another aspect of the present invention, there is provided a vinyl chloride copolymer prepared by the above preparation method.

Advantageous Effects

In the preparation method according to the present invention, an N-substituted maleimide based compound used as a comonomer together with a vinyl chloride monomer is not injected at one time in a pre-polymerization step, but injected in division in a specific ratio, thereby easily preparing a copolymer with the uniform distribution of the N-substituted maleimide based compound and the vinyl chloride monomer.

In addition, by preparing the vinyl chloride copolymer according to the present invention by the preparation method, an increased single glass transition temperature may be attained, and at the same time, a heat deformation temperature may be increased, thereby accomplishing good heat resistance.

Accordingly, the method for preparing a vinyl chloride copolymer and the vinyl chloride copolymer according to the present invention may be readily applied to industries requiring the copolymer, and particularly to industries requiring a resin having good heat resistance as well as industries using a vinyl chloride resin.

BEST MODE FOR CARRYING OUT THE INVENTION

Hereinafter, the present invention will be described in more detail to assist the understanding of the present invention.

It will be understood that words or terms used in the specification and claims shall not be interpreted as the meaning used in common or defined in dictionaries. It will be further understood that the words or terms should be interpreted as having a meaning that is consistent with their meaning in the context of the relevant art and the technical idea of the invention, based on the principle that an inventor may properly define the meaning of the words or terms.

The present invention provides a method for preparing a vinyl chloride copolymer having good heat resistance.

The method for preparing a vinyl chloride copolymer according to the present invention is characterized in including pre-polymerizing for forming seed particles by polymerizing a vinyl chloride monomer and a first copolymerizable monomer (Step 1); and post-polymerizing for adding a second copolymerizable monomer to the seed particles and polymerizing (Step 2), wherein a total amount of the first copolymerizable monomer and the second copolymerizable monomer is from 5 to 30 parts by weight on the basis of 100 parts by weight of the vinyl chloride monomer.

Step 1 is a pre-polymerization step for forming seed particles by polymerizing a vinyl chloride monomer and a first copolymerizable monomer, and may be performed by injecting the vinyl chloride monomer and the first copolymerizable monomer to a pre-polymerization reactor and performing a bulk polymerization.

The vinyl chloride monomer may be a single material of a pure vinyl chloride monomer or a mixture of the vinyl chloride monomer and a vinyl monomer copolymerizable therewith. In the case where the vinyl chloride monomer is a mixture of the vinyl chloride monomer and the vinyl monomer copolymerizable therewith, the ratio of the mixture may be controlled so that vinyl chloride may be included in a ratio of 50% or more in a finally prepared vinyl chloride resin and used.

The vinyl monomer copolymerizable with the vinyl chloride monomer are not specifically limited, however may include, for example, an olefin compound such as propylene and butene, vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; vinylidene halides such as vinylidene chloride; unsaturated fatty acids and fatty acid anhydride such as acrylic acid, methacrylic acid, itaconic acid, maleic acid, fumaric acid, maleic anhydride, and itaconic anhydride; unsaturated fatty acid esters such as methyl acrylate, ethyl acrylate, monomethyl maleate, dimethyl maleate, and butyl benzyl maleate; a cross-linkable monomer such as diaryl phthalate, etc., and the vinyl monomer may be used alone or as a combination of at least two thereof.

The first copolymerizable monomer according to an embodiment of the present invention may be the same material as the second copolymerizable monomer injected in a subsequent Step 2.

Particularly, both the first copolymerizable monomer and the second copolymerizable monomer may be an N-substituted maleimide based monomer. That is, "the first" and "the second" in the first copolymerizable monomer and the second copolymerizable monomer may mean the difference of injecting time. For example, the first copolymerizable monomer may mean the N-substituted maleimide based monomer injected in the pre-polymerization step, and the second copolymerizable monomer may mean the N-substituted maleimide based monomer injected in the post-polymerization step.

The N-substituted maleimide based monomer may be at least one selected from the group consisting of N-methyl maleimide, N-ethyl maleimide, N-n-propyl maleimide, N-isopropyl maleimide, N-n-butyl maleimide, N-phenyl maleimide, N-hydroxyphenyl maleimide, N-carboxyphenyl maleimide, N-nitrophenyl maleimide, and N-methylphenyl maleimide. Particularly, the N-substituted maleimide based monomer may be N-phenyl maleimide.

The N-substituted maleimide based monomer may be used in an amount ratio of 5 to 30 parts by weight on the basis of 100 parts by weight of the vinyl chloride monomer. That is, the total amount of the first copolymerizable monomer injected in the pre-polymerizations step and the second copolymerizable monomer injected in the post-polymerization step may be 5 to 30 parts by weight on the basis of 100 parts by weight of the vinyl chloride monomer. In this case, the amount of the first copolymerizable monomer injected in the pre-polymerizations step may be relatively smaller than the amount of the second copolymerizable monomer injected in the post-polymerization step. Particularly, the weight ratio of the first copolymerizable monomer and the second copolymerizable monomer may be between 3:7 and 4:6. For example, in the case where the total amount of the first copolymerizable monomer and the second copolymerizable monomer is 10 parts by weight, the amount of the first copolymerizable monomer may be 3 to 4 parts by weight, and the amount of the second copolymerizable monomer may be 6 to 7 parts by weight. In the case where the amount of the first copolymerizable monomer is greater than the second copolymerizable monomer, that is, in the case where the ratio of the first copolymerizable monomer and the second copolymerizable monomer deviates from the above-range, seed particles may not be stably formed, and thus, the improving effect of heat resistance may decrease.

Here, the seed particles may mean primary particles formed by coagulating base particles formed via the combination of vinyl chloride monomers and secondary particles formed by coagulating primary seed particles formed by coagulating first copolymerizable monomer particles. In this case, the seed particles may have relatively greater pores than the pores in a finally prepared copolymer.

The pre-polymerization of Step 1 may be performed in the presence of a pre-polymerization initiator. The amount used of the pre-polymerization initiator is not specifically limited, however may be, for example, 0.01 to 1 parts by weight on the basis of 100 parts by weight of the vinyl chloride monomer. In addition, the kind of the pre-polymerization initiator is not specifically limited, however may be, for example, a peroxyester or peroxydicarbonate compound.

Particularly, di-2-ethylhexyl peroxydicarbonate, t-butyl peroxyneodecanoate, diisopropyl peroxydicarbonate, methyl ethyl ketone peroxide, di-3-methoxybutyl per oxydicarbonate, t-butyl peroxypivalate, t-amyl peroxypivalate, t-hexyl peroxypivalate, or a mixture thereof.

In addition, the pre-polymerization is not specifically limited, however may be performed, for example, under a reaction pressure between 8.5 K/G and 13 K/G at a temperature range between 30° C. and 70° C.

Step 2 is a post-polymerization step for preparing a vinyl chloride copolymer by growing the seed particles formed at the pre-polymerization step, and may be performed by injecting the second copolymerizable monomer to the seed particles formed at the pre-polymerization step and performing a bulk polymerization. In this case, the vinyl chloride monomer may be additionally used as occasion demands, and the amount used may be appropriately controlled according to the need.

Particularly, the seed particles formed at the pre-polymerization step may be transported to a post-polymerization reactor, a second copolymerizable monomer may be injected, the reaction pressure and the temperature of the reactor may be controlled, and then, the bulk polymerization may be performed. In the case where the vinyl chloride monomer is additionally used in the post-polymerization step, the post-polymerization reactor may be filled with the vinyl chloride monomer prior to transporting the seed particles.

Here, the "filling" may mean injection or existence.

The second copolymerizable monomer may be the same material as the first copolymerizable monomer as described above, and the amount used of the second copolymerizable monomer may be in the ratio range described above.

In addition, the second copolymerizable monomer may be added together with a post-polymerization initiator immediately after initiation, or at a time within ¼ of an entire post-polymerization process after initiating the post-polymerization. In this case, the time within ¼ of the entire post-polymerization process may mean the time when reaching ¼ among the total time period necessary for performing the post-polymerization from immediately after the initiation of the post-polymerization. For example, in the case where the total time of the post-polymerization process is 100 minutes, the time within ¼ may be the time between the immediately after the initiation of the post-polymerization and 25 minutes. If the second copolymerizable monomer is injected after initiating the post-polymerization and after the time within ¼ of the entire post-polymerization process, the second copolymerizable monomer injected may not react with the seed particles but may react with the second copolymerization monomer among themselves, and separate particles may be formed, thereby deteriorating the heat resistance of a vinyl chloride resin.

The post-polymerization of Step 2 may be performed in the presence of a post-polymerization initiator according to the need. The amount used of the post-polymerization initiator is not specifically limited, however may be, for example, 0.01 to 2 parts by weight on the basis of 100 parts by weight of the vinyl chloride monomer. In addition, the post-polymerization initiator may be injected together with the seed particles into the post-polymerization reactor, at any time when the transportation of the seed particles is completed, or during performing the post-polymerization. Particularly, the post-polymerization initiator may be injected immediately after completing the transportation of the seed particles, after completing the transportation and initiating the post-polymerization, or after initiating the post-polymerization and at a time within ¼ during the entire post-polymerization process. In this case, the post-polymerization initiator may be injected at one time, or may be injected in division, and separately or continuously at various time points.

The kind of the post-polymerization initiator is not specifically limited, however may use, for example, a peroxyester or peroxydicarbonate compound. Particularly, the post-polymerization initiator may include cumyl peroxy ester, t-butyl peroxy ester, octyl peroxydicarbonate, 1,1,3,3-tetramethyl butyl peroxy neodicarbonate, diisopropyl peroxydicarbonate, methyl ethyl ketone peroxide, di-3-methoxybutyl peroxydicarbonate, t-butyl peroxypivalate, t-amyl peroxypivalate, t-hexyl peroxypivalate, or a combination thereof.

In addition, the post-polymerization is not specifically limited, however, may be performed, for example, under a reaction pressure between 7.5 K/G and 11 K/G at a temperature range between 30° C. and 70° C.

In the preparation method according to an embodiment of the present invention, a polymerization inhibitor may be injected during the last period of the post-polymerization to remove the reactivity of the remaining post-polymerization initiator.

The polymerization inhibitor is not specifically limited, however may include, for example, hydroquinone, butylated hydroxyl toluene, monomethyl ether hydroquinone, quaternary butyl catechol, diphenylamine, triisopropanolamine, triethanolamine, etc. The amount of the polymerization inhibitor may be appropriately controlled according to the amount of the post-polymerization initiator, and may be, for example, 0.001 to 0.1 parts by weight on the basis of 100 parts by weight of the vinyl chloride monomer.

In addition, in the preparation method according to an embodiment of the present invention, a reaction medium may be mixed with the vinyl chloride monomer and used, and additives such as a molecular weight regulator and antioxidant may be additionally included in addition to the above-described effective components.

The reaction medium is not specifically limited, however may include, for example, an aromatic compound such as benzene, toluene, and xylene; methyl ethyl ketone, acetone, n-hexane, chloroform, cyclohexane, etc.

The molecular weight regulator is not specifically limited, however may include, for example, n-butylmercaptan, n-octylmercaptan, n-dodecylmercaptan, t-dodecylmercaptan, etc.

In addition, the antioxidant is not specifically limited, however may include, for example, 2,5-di-t-butyl-p-cresol (BHT), polyvinyl acetate-co-crotonic acid, and triethylene glycol bis[3-(3-t-butyl-5-methyl-4-hydroxyphenyl)propionate].

Further, the preparation method according to an embodiment of the present invention may further include a devolatilization step after the post-polymerization step.

In the preparation method according to an embodiment of the present invention, an N-substituted maleimide based compound used as a comonomer together with the vinyl chloride monomer may not be injected at one time in a pre-polymerization step, but injected in division in a specific ratio, thereby easily preparing a copolymer with a uniform distribution of the N-substituted maleimide based compound and the vinyl chloride monomer, and improving the heat resistance of the vinyl chloride copolymer thus produced.

In addition, there is provided in the present invention a vinyl chloride copolymer prepared by the above-described preparation method.

The vinyl chloride copolymer according to an embodiment of the present invention is characterized in including 5 to 30 wt % of a derived part from an N-substituted maleimide based monomer.

The N-substituted maleimide based monomer may be the same as described above. The derived part from the N-substituted maleimide based monomer represents a derived part from an N-substituted maleimide based monomer in the vinyl chloride copolymer and may represent the N-substituted maleimide based monomer itself, or any particles formed using the N-substituted maleimide based monomer as a main component.

The vinyl chloride copolymer may have a glass transition temperature (Tg) in a temperature range between 100° C. and 120° C. In addition, the vinyl chloride copolymer may have a heat deformation temperature (HDT) in a temperature range between 92° C. and 110° C. The glass transition temperature is obtained as follows. The temperature of the copolymer is elevated from room temperature to 200° C. by 10° C./min using a differential scanning calorimetry (DSC) Ta instrument Q10, then decreased to −80° C. by 20° C./min, and then elevated again, and the maximum variation point of heat flow among a range where a phase change arise, is measured. In addition, the heat deformation temperature (HDT) is obtained as follows. 100 parts by weight of the vinyl chloride copolymer, 3 parts by weight of a tin-based stabilizer and 0.5 parts by weight of stearic acid were mixed in a roll-type kneading device for 3 minutes and press molded with a temperature of 190° C. and a pressure of 80 kg/cm$^2$ for 10 minutes to manufacture a plate shape specimen with a thickness of 3 mm. Then, according to the ASTM D648 standard, each specimen was impregnated in oil and pre-heated for 4 minutes, and the temperature was elevated in an increasing rate of 120° C./hour. During heating, the temperature when the specimen droops by 0.254 mm was measured.

The vinyl chloride copolymer according to an embodiment of the present invention is prepared by the above-described preparation method, and may have increased glass transition temperature and heat deformation temperature. Accordingly, the vinyl chloride copolymer may exhibit relatively better heat resistance when compared to a common vinyl chloride polymer.

Hereinafter, the present invention will be explained in more detail referring to embodiments and experimental embodiments. However the following embodiments and experimental embodiments are only for illustrating the present invention, and the scope of the present invention is not limited thereto.

Example 1

To a stainless steel pre-polymerization reactor having an internal volume of 1 m$^3$ and equipped with a stirrer, 100 parts by weight of a vinyl chloride monomer, 2 parts by weight of N-phenyl maleimide, and 0.03 parts by weight of t-butyl peroxyneodecanoate (BND) were added, and the interior of the reactor was degassed using a vacuum pump while stirring. The pre-polymerization reaction was performed for minutes while maintaining the pressure in the pre-polymerization reactor to 12 K/G to form seed particles. The seed particles thus formed were transported to a stainless steel post-polymerization reactor having an internal volume of 1 m$^3$ and equipped with a stirrer, and at the time when the transportation was finished, 3 parts by weight of N-phenyl maleimide, 0.0001 parts by weight of 2,6-di-t-butyl-p-cresol (BHT), 0.00009 parts by weight of polyvinyl acetate-co-crotonic acid (CT-5), and 0.078 parts by weight of 1,1,3,3-tetramethylbutyl peroxy neodicarbonate (OND) were injected, and the interior of the reactor was degassed using a vacuum pump while stirring. The post-polymerization reaction was performed for 180 minutes while maintaining the pressure in the post-polymerization reactor to 7.8 K/G. Then, 0.05 parts by weight of triethylene glycol bis-[3-(3-t-butyl-5-methyl-4-hydroxyphenyl) propionate] was added, and unreacted monomer was recovered to obtain a vinyl chloride copolymer.

Example 2

A vinyl chloride copolymer was obtained by performing the same procedure described in Example 1 except for injecting N-phenyl maleimide in an amount ratio of 8 parts by weight in the pre-polymerization step, and injecting 12 parts by weight in the post-polymerizations step.

Example 3

A vinyl chloride copolymer was obtained by performing the same procedure described in Example 1 except for injecting N-phenyl maleimide in an amount ratio of 12 parts by weight in the pre-polymerization step, and injecting 18 parts by weight in the post-polymerizations step.

Example 4

A vinyl chloride copolymer was obtained by performing the same procedure described in Example 1 except for injecting N-phenyl maleimide in an amount ratio of 6 parts by weight in the pre-polymerization step, and injecting 14 parts by weight in the post-polymerizations step.

Example 5

A vinyl chloride copolymer was obtained by performing the same procedure described in Example 1 except for injecting N-phenyl maleimide in an amount ratio of 8 parts by weight in the pre-polymerization step, and injecting 12 parts by weight at the point of 30 minutes from the initiation of the post-polymerization in the post-polymerizations step.

Comparative Example 1

A vinyl chloride copolymer was obtained by performing the same procedure described in Example 1 except for not using N-phenyl maleimide.

Comparative Example 2

A vinyl chloride copolymer was obtained by performing the same procedure described in Example 1 except for injecting N-phenyl maleimide in an amount ratio of 5 parts by weight only in the pre-polymerization step, and not injecting thereof in the post-polymerizations step.

Comparative Example 3

A vinyl chloride copolymer was obtained by performing the same procedure described in Example 1 except for not injecting N-phenyl maleimide in the pre-polymerization step, and injecting 5 parts by weight only in the post-polymerizations step.

Comparative Example 4

A vinyl chloride copolymer was obtained by performing the same procedure described in Example 1 except for injecting N-phenyl maleimide in an amount ratio of 2 parts by weight in the pre-polymerization step, and injecting 18 parts by weight in the post-polymerizations step.

Comparative Example 5

A vinyl chloride copolymer was obtained by performing the same procedure described in Example 1 except for injecting N-phenyl maleimide in an amount ratio of 4 parts by weight in the pre-polymerization step, and injecting 16 parts by weight in the post-polymerizations step.

Comparative Example 6

A vinyl chloride copolymer was obtained by performing the same procedure described in Example 1 except for injecting N-phenyl maleimide in an amount ratio of 12 parts by weight in the pre-polymerization step, and injecting 8 parts by weight in the post-polymerizations step.

Comparative Example 7

A vinyl chloride copolymer was obtained by performing the same procedure described in Example 1 except for injecting N-phenyl maleimide in an amount ratio of 8 parts by weight in the pre-polymerization step, and injecting 12 parts by weight at the point of 60 minutes from the initiation of the post-polymerization in the post-polymerizations step.

Comparative Example 8

A vinyl chloride copolymer was obtained by performing the same procedure described in Example 1 except for injecting N-phenyl maleimide in an amount ratio of 8 parts by weight in the pre-polymerization step, and injecting 12 parts by weight at the point of 90 minutes from the initiation of the post-polymerization in the post-polymerizations step.

Comparative Example 9

To a stainless steel polymerization reactor having an internal volume of 1 m$^3$ and equipped with a refluxing condenser and a stirrer, 140 parts by weight of polywater, 0.05 parts by weight of polyvinyl alcohol having a hydration degree of 88%, 0.02 parts by weight of polyvinyl alcohol having a hydration degree of 72%, 0.015 parts by weight of polyvinyl alcohol having a hydration degree of 55%, 0.005 parts by weight of hydroxypropylmethyl cellulose, and 0.088 parts by weight of t-butyl peroxyneodecanoate (BND) were added, and the interior of the reactor was degassed using a vacuum pump while stirring. Then, 100 parts by weight of a vinyl chloride monomer and 5 parts by weight of N-phenyl maleimide were injected at one time. The reaction was performed while maintaining the temperature in the polymerization reactor to 62° C. during performing entire reaction processes. The polymerization was stopped at the point when the pressure of the polymerization reactor changed by 1.0 kg/cm$^2$, and 0.088 parts by weight of triethylene glycol bis-[3(3-t-butyl-5-methyl-4-hydroxyphenyl)propionate] was added, unreacted monomer was recovered, and the copolymer slurry thus formed was recovered. The slurry was dried in a fluidized bed dryer to obtain a vinyl chloride copolymer.

Comparative Example 10

A vinyl chloride copolymer was obtained by performing the same procedure described in Comparative Example 9 except for using 20 parts by weight of N-phenyl maleimide.

Experimental Examples

In order for comparative analysis of the physical properties of the vinyl chloride copolymers prepared in Examples 1 to 5, the vinyl chloride polymer prepared in Comparative Example 1, and the vinyl chloride copolymer prepared in Comparative Examples 2 to 10, the glass transition temperature and the heat deformation temperature of each vinyl chloride copolymer and vinyl chloride polymer were measured. The results are shown in the following Table 1.

1) Glass Transition Temperature (Tg, ° C.)

The glass transition temperature was measured using a differential scanning calorimetry (DSC) Ta instrument Q10. Particularly, the temperature of each of the vinyl chloride copolymer and the vinyl chloride polymer was elevated from room temperature to 200° C. by 10° C./min, then decreased to −80° C. by 20° C./min, and then elevated again, and the maximum variation point of heat flow among a range where a phase change arise, was measured.

2) Heat Deformation Temperature (HDT)

100 parts by weight of each of the vinyl chloride copolymer and the vinyl chloride polymer, 3 parts by weight of a tin-based stabilizer and 0.5 parts by weight of stearic acid were mixed in a roll-type kneading device for 3 minutes and press molded with a temperature of 190° C. and a pressure of 80 kg/cm$^2$ for 10 minutes to manufacture a plate shape specimen with a thickness of 3 mm. Then, according to the ASTM D648 standard, the specimen thus manufactured was precisely cut to produce a specimen for testing heat resistance. Load was calculated according to the size of the specimen thus manufactured and the load determined was applied to the specimen. After that, each specimen was impregnated in oil and pre-heated for 4 minutes, the temperature was elevated in a rate of 120° C./hour, and the temperature when the specimen droops by 0.254 mm was measured.

TABLE 1

| Division | Glass transition temperature (Tg, ° C.) | Heat deformation temperature (HDT, ° C.) |
| --- | --- | --- |
| Example 1 | 109.7 | 94.1 |
| Example 2 | 114.5 | 100.2 |
| Example 3 | 117.2 | 104.2 |
| Example 4 | 113.9 | 100 |
| Example 5 | 113.5 | 100.2 |
| Comparative Example 1 | 100.3 | 80.7 |
| Comparative Example 2 | 119.2 | 88.1 |
| Comparative Example 3 | 108.6 | 88.4 |
| Comparative Example 4 | 108.6 | 88.6 |
| Comparative Example 5 | 110.4 | 94.6 |
| Comparative Example 6 | 110.1 | 94.0 |
| Comparative Example 7 | 110.6 | 95.1 |
| Comparative Example 8 | 104 | 90.2 |

TABLE 1-continued

| Division | Glass transition temperature (Tg, ° C.) | Heat deformation temperature (HDT, ° C.) |
|---|---|---|
| Comparative Example 9 | 106 | 83.7 |
| Comparative Example 10 | 106.8 | 93.3 |

As shown in table 1, the vinyl chloride copolymers of Examples 1 to 5 prepared by the preparation method of the present invention generally exhibited higher glass transition temperature and increased heat deformation temperature when compared to those of the vinyl chloride polymer of Comparative Example 1 and the vinyl chloride copolymers of Comparative Examples 2 to 10.

Particularly, when comparing the vinyl chloride copolymer of Example 1 (using 5 parts by weight of N-phenyl maleimide) and the vinyl chloride polymer of Comparative Example 1 (homopolymer of vinyl chloride monomer), the glass transition temperature of the vinyl chloride copolymer of Example 1 was increased by about 10%, and the heat deformation temperature was increased by about 16% than the vinyl chloride polymer of Comparative Example 1. The results indicate that the vinyl chloride copolymer of Example 1 prepared by an embodiment of the present invention has markedly good heat resistance when compared to the common vinyl chloride polymer.

In addition, the vinyl chloride copolymers of Examples 1 to 4 prepared by injecting N-phenyl maleimide in division in a ratio between 3:7 and 4:6 in the pre-polymerization and the post-polymerization by the preparation method according to an embodiment of the present invention, and the vinyl chloride copolymers of Comparative Examples 2 to 6 prepared by injecting N-phenyl maleimide in a ratio deviated from the injection ratio suggested in the preparation method according to an embodiment of the present invention were compared, and the vinyl chloride copolymer of Examples 2 to 4 generally exhibited somewhat increased glass transition temperature when compared to the vinyl chloride copolymers of Comparative Examples 2 to 6. When comparing each vinyl chloride copolymer prepared using the same amount of N-phenyl maleimide, the heat deformation temperature of the vinyl chloride copolymers of Examples 2 to 4 was generally increased by about 6-12% than the vinyl chloride copolymers of Comparative Examples 2 to 6.

In addition, when comparing the vinyl chloride copolymer of Example 5 prepared by injecting N-phenyl maleimide at the time within ¼ of an entire post-polymerization process after the initiation of the post-polymerization with the vinyl chloride copolymer of Comparative Examples 7 and 8 prepared by injecting N-phenyl maleimide at the time deviated from the time within ¼, the glass transition temperature was increased by about 3% or 9%, and at the same time, the heat deformation temperature was increased by about 5% or 11%.

The results indicate that the heat resistance may be largely improved by easily preparing a copolymer with uniform distribution of N-phenyl maleimide and a vinyl chloride monomer by injecting N-phenyl maleimide in division in a specific ratio at a specific point in the pre-polymerization and the post-polymerization.

Meanwhile, the vinyl chloride copolymers of Comparative Examples 9 and 10 prepared not by the preparation via a bulk polymerization according to an embodiment of the present invention but by a commonly known suspension polymerization showed decreased glass transition temperature and decreased heat deformation temperature by about 89% (Comparative Example 9 with respect to Example 1) and about 93% (Comparative Example 10 with respect to Example 2) when compared to Example 1 (with respect to Comparative Example 9) and Example 2 (with respect to Comparative Example 10). Accordingly, the results indicate that the preparation method via the bulk polymerization according to the present invention may result a vinyl chloride copolymer having markedly good heat resistance when compared to the preparation method via a common suspension polymerization.

The invention claimed is:

1. A method for preparing a vinyl chloride copolymer comprising:
    pre-polymerizing for forming seed particles by polymerizing the vinyl chloride monomer and a first copolymerizable monomer; and
    post-polymerizing for adding a second copolymerizable monomer to the seed particles and polymerizing,
    wherein a total amount of the first copolymerizable monomer and the second copolymerizable monomer is from 5 to 30 parts by weight on the basis of 100 parts by weight of the vinyl chloride monomer,
    wherein the first copolymerizable monomer and the second copolymerizable monomer are an N-substituted maleimide based monomer, and
    wherein the first copolymerizable monomer and the second copolymerizable monomer are used in a weight ratio between 3:7 and 4:6.

2. The method for preparing a vinyl chloride copolymer of claim 1, wherein the second copolymerizable monomer is added at a time within ¼ of an entire post-polymerization process after initiating the post-polymerization.

3. The method for preparing a vinyl chloride copolymer of claim 1, wherein the first copolymerizable monomer and the second copolymerizable monomer are the same material.

4. The method for preparing a vinyl chloride copolymer of claim 1, wherein the N-substituted maleimide based monomer is at least one selected from the group consisting of N-methyl maleimide, N-ethyl maleimide, N-n-propyl maleimide, N-isopropyl maleimide, N-n-butyl maleimide, N-phenyl maleimide, N-hydroxyphenyl maleimide, N-carboxyphenyl maleimide, N-nitrophenyl maleimide, and N-methylphenyl maleimide.

5. The method for preparing a vinyl chloride copolymer of claim 1, wherein the N-substituted maleimide based monomer is N-phenyl maleimide.

6. The method for preparing a vinyl chloride copolymer of claim 1, wherein the pre-polymerization is performed by a bulk polymerization under a reaction pressure between 8.5 K/G and 13 K/G at a temperature between 30° C. and 70° C.

7. The method for preparing a vinyl chloride copolymer of claim 1, wherein the post-polymerization is performed by a bulk polymerization under a reaction pressure between 7.5 K/G and 11 K/G at a temperature between 30° C. and 70° C.

8. A vinyl chloride copolymer prepared by the preparation method of claim 1,
    wherein the vinyl chloride copolymer comprises a part derived from an N-substituted maleimide based monomer in an amount ratio between 5 wt % and 30 wt %.

9. The vinyl chloride copolymer of claim 8, wherein the N-substituted maleimide based monomer is N-phenyl maleimide.

10. The vinyl chloride copolymer of claim 8, wherein the vinyl chloride copolymer has a glass transition temperature (Tg) in a temperature range between 100° C. and 120° C.

11. The vinyl chloride copolymer of claim 8, wherein the vinyl chloride copolymer has a heat deformation temperature (HDT) in a temperature range between 92° C. and 110° C.

* * * * *